Jan. 11, 1966        G. R. SNYDER        3,228,801

DEFERRED ACTION DRY CELL

Filed Sept. 26, 1963

INVENTOR,
GILBERT R. SNYDER

United States Patent Office 3,228,801
Patented Jan. 11, 1966

3,228,801
DEFERRED ACTION DRY CELL
Gilbert R. Snyder, Arlington, Va., assignor to the United States of America as represented by the Secretary of the Army
Filed Sept. 26, 1963. Ser. No. 311,925
5 Claims. (Cl. 136—113)
(Granted under Title 35, U.S. Code (1952), sec. 266)

The invention described herein may be manufactured and used by or for the Government of the United States of America for governmental purposes without the payment to me of any royalty thereon.

This invention relates to primary dry cells, and more particularly to dry cells of the deferred action type.

As is known from common experience, electrical dry cells deteriorate and become inoperable while merely sitting on the "shelf" without ever being put into use. The reasons for this have been known, and well understood for a long time, and stem from the fact that electrical dry cells are commercially manufactured as completely assembled units, including the active as well as the inactive ingredients of the electroletic mix. The term dry cell is, of course, a misnomer. Both the standard type Le Clanche dry cell, and the more recent alkaline type cells, require the presence of ions for their operation, which necessitates the presence of a liquid electrolyte as an active ingredient. The limited shelf life exhibited by common dry cells stems from a secondary chemical reaction between the electrolyte and electrodes, and/or from the drying out of the electrolyte.

The deferred cell is an attempt to overcome these disadvantages. The basic scheme is to keep the electrolyte out of contact with the electrodes until the cell is ready for use. The prior art has suggested deferred action cells which utilize a fragile ampoule containing liquid electrolyte which, when broken, permits the electrolyte to contact the cell electrodes and thus activate the cell. However, the ampoule is often accidently broken by shock or impact before it is desired to activate and use the cell. Also, such cells may not give optimum performance at low temperatures because of the high viscosity of the electrolyte at low temperatures and a resultant lack of rapid contact between the electrodes and the electrolyte. The latter disadvantage may also be encountered in the deferred action cells which are assembled without the use of ampoules and which are activated by addition, from outside the cell, of liquid electrolyte. Moreover, when the liquid electrolyte is a corrosive caustic solution, additional handling and bulk storage dangers are present.

Another suggested solution of the prior art is to assemble the dry cell with the electrolyte in place and interpose a liner between the electrolyte and the elecrode. Such schemes, while free of many of the difficulties associated with the aforementioned ampoule type deferred action cell, only protect the electrodes from the secondary chemical reaction, and have not provided any way to prevent drying out of the cell. This is the primary reason why the interposed barrier, deferred action cell has not gained acceptance in the art.

It is therefore an object of this invention to provide a deferred action dry cell which undergoes substantially no deterioration during storage, is rendered active by a simple operation, and upon activation, delivers its full power instantly.

Another object of this invention is to provide a deferred action dry cell which will not be accidently activated, but when needed, can be rendered active by a simple, continuous manipulation.

Still another object of this invention is to provide a barrier type deferred action dry cell which is hermetically sealed while deactivated to prevent moisture transmission.

The specific nature of the invention, as well as other objects, uses and advantages thereof, will clearly appear from the following description and from the accompanying drawing, in which.

Figure 1:
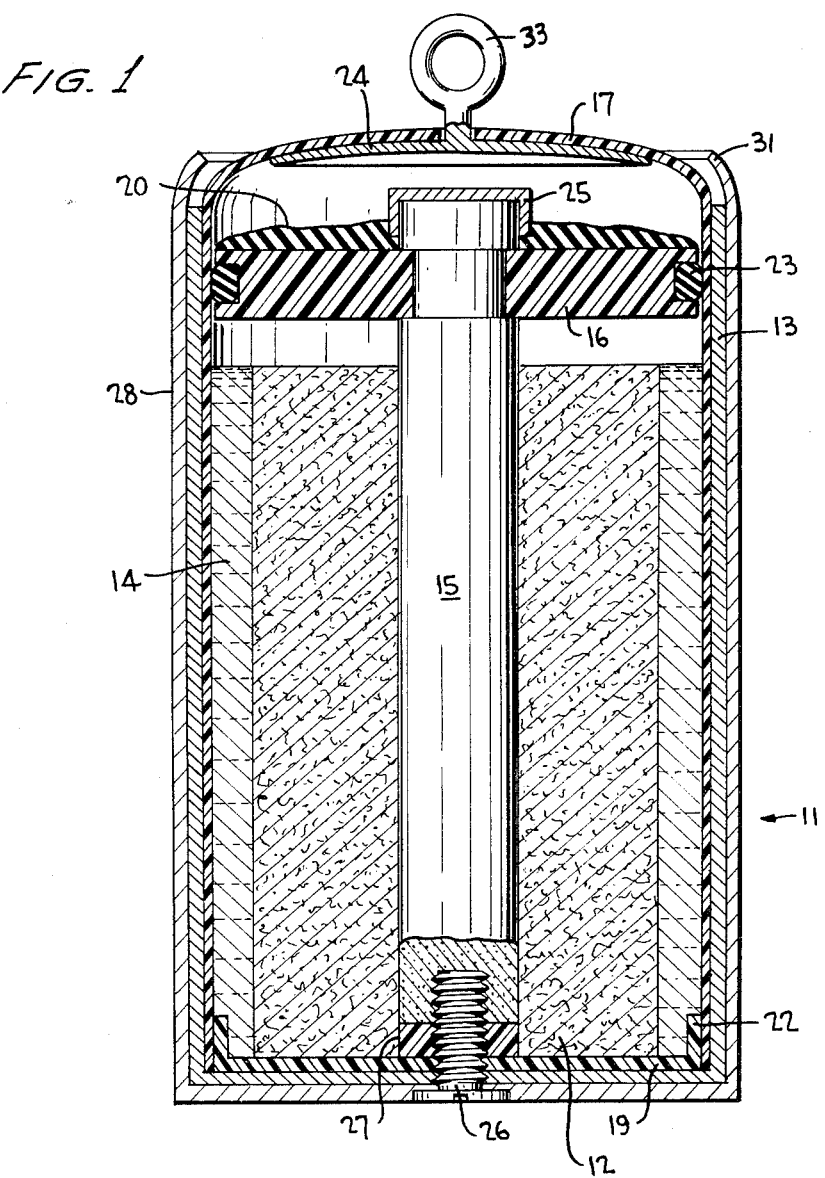
FIG. 1 is a sectional view of a deferred action dry cell constructed in accordance with the teachings of this invention, in its deactivated state.

The teachings of the present invention are applicable to any of the common dry cells, and may be applied to either the standard Le Chanche dry cell, or a dry cell having an alkaline electrolyte. The embodiment shown in FIG. 1 applies the teachings of this invention to a dry cell of the type commonly referred to as a flashlight battery. Although the chemical reactions of the cell form no part of this invention, the principle parts of the cell are shown to facilitate an understanding of the invention.

The deferred action cell 11 has a depolarizer mix 12, most commonly comprising a mix of manganese dioxide with carbon black or graphite to make the mixture conducting. This mix occupies most of the interior of the cell, and serves as a cathode and depolarizer. A zinc cup or "can" 13 serves as the anode and container of the cell. A layer of gelatinous paste 14 between the mix 12 and the zinc can 13 is the electrolytically conducting medium which holds a large part of the electrolyte, the remainder being absorbed by the mix 12. The paste 14 also serves as a diaphragm or wall to separate the anode and cathode of the cell. A central carbon rod 15 is embedded in the mix 12, and is sometimes called the positive electrode; it is not strictly an electrode, but rather a collector and conductor of electric current from the cathode to the positive terminal external to the cell. The carbon rod serves another function somewhat more obscure. It is sufficiently porous to permit the escape of gases which would otherwise create an undue pressure in the cell. The carbon rod does not, however, permit the escape of fluid electrolyte. A top insulating seal 16 closes the cell 11 and makes it available for use in any position. The construction thus far described is standard, and is intended to represent any of a number of common dry cells.

In accordance with the teachings of this invention, applicant provides an impervious barrier 17 between the electrolyte paste 14 and the zinc can 13. This barrier 17 completely surrounds the electrolyte, not only protecting the zinc anode 13 from chemical action, but also preventing dry out of the electrolyte. In this embodiment shown, the protective liner 17 is made up of two sections; an upper cup-shaped section which may be slidably removed, and a lower section 19 which covers the bottom of the cell. The two sections are made tight by means of the overlap indicated at 22. The liner 17 is preferably made from a plastic insulating material having good tensile strength and a low coefficient of friction. Plastics made from fully fluorinated copolymers of ethylene and propylene are highly suitable for this purpose. Such a material is "Teflon." The barrier 17 is preferably quite thin, on the order of .006 inch thick.

To activate the cell 11 the liner 17 is removed by grasping the cell in one hand and a pull ring 33, which is attached to a force distributing plate 24, in the other, and pulling the liner 17 out of the cell. As the liner is removed, a slight vacuum is created between the paste 14 and the zinc can 13, and the paste immediately fills the very slightly void left by the removal of the liner, immediately activating the cell, even at low temperature.

To keep the cell sealed after the removal of the liner 17, the top seal 16 is provided with a resilient, deformable, O ring 23. The O ring 23 not only provides a tight seal between the line 17 and the zinc can 13, while helping to keep the liner 17 in place, but also immediately maintains the seal to prevent the escape of electrolyte after the liner has been removed.

The seal 16 is preferably constructed from a machinable plastic, such as a polycarbonate plastic. One preferred material is that sold under the trade name "Lexan." The O ring 23 may be made of rubber or neoprene. Preferably, a potting compound 20, such as epoxy tar, is placed on the top seal 16 to provide a good liquid seal between the seal and the carbon electrode 15.

Since there is a tendency to pull the entire body out of the zinc can 13 when the liner 17 is removed, several additional features have been incorporated in the embodiment shown in FIG. 1. The top seal 16 may be keyed into the carbon rod 15 as shown, and the carbon rod may be then attached to the zinc can 13 by means of an insulating screw 26, such as a screw made out of nylon. To protect the liner 19 a nylon washer 27 may be provided. Additionally, when an outside steel jacket or can such as steel jacket 28 is used, the upper edge may be turned inward so as to extend beyond the outer periphery of the top plate 16. In this manner the steel can 28 will prevent the bobbin from being lifted out of the zinc can 13.

Figure 2:
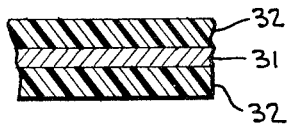
FIG. 2 is a sectional view showing a detail of a preferred form of protective liner.

While for most applications a barrier liner 17 made of "Teflon" will provide a sufficient moisture seal to prevent the electrolyte from drying out, a metalized "Teflon" barrier may be preferable for some applications. FIG. 2 shows a fragmented, sectional view, illustrating the construction of this type of liner. As illustrated in FIG. 2, the liner 17 may consist of a piece of copper 31 sandwiched between two pieces of "Teflon" 32. The copper 31 provides an absolute moisture seal, and insures that the electrolyte will not dry out. Each of the "Teflon" layers may be on the order of .003 inch thick, and the copper 31 on the order of .001 inch thick.

It will be apparent that the embodiments shown are only exemplary and that various modifications can be made in construction and arrangement within the scope of the invention as defined in the appended claims.

I claim as my invention:

1. A deferred action dry cell comprising:
    (a) a first electrode, and a second electrode surrounding said first electrode,
    (b) an electrolyte disposed in the volume between said first and second electrodes, the area between said electrodes being sealed at one end,
    (c) an impervious protective liner surrounding said electrolyte in sliding contact with said second electrode, and
    (d) means for sealing the area between electrodes at the other end, including resilient area deformable means, said liner extending through said means for sealing and engaged by said deformable means whereby said liner may be grasped from without said cell and withdrawn, said means for sealing maintaining said cell in a sealed condition after said protective liner has been withdrawn.

2. A deferred action dry cell comprising:
    (a) a central electrode and a outer coaxial electrode surrounding said central electrode, the area between said electrodes at one end being permanently sealed,
    (b) an electrolyte filling the volume between said electrodes,
    (c) a thin plastic protective liner surrounding said first electrode and said electrolyte and extending beyond said electrodes, said protective liner fitting in a slidable and removable relation inside said outer coaxial electrode and separating said electrolyte from said outer coaxial electrode whereby that portion of said liner extending beyond said electrodes may be grasped and pulled to remove said liner,
    (d) means for sealing the area between said electrodes at the other end including a resilient deformable means exerting an outwardly directed force urging said protective liner against said outer electrode, and expandable to maintain said cell in a sealed condition when said protective liner has been removed to activate said cell, said means for sealing providing an air and moisture tight seal which prevents said electrolyte from drying out.

3. A deferred action dry cell as in claim 2 wherein said resilient deformable means is an O ring.

4. A deferred action dry cell as in claim 3, wherein a force distributing plate having a pull ring is bonded to that portion of said liner extending beyond said electrodes for facilitating the removal of said liner.

5. A deferred action dry cell as in claim 4 wherein said protective liner includes a second thin plastic piece coextensive with the permanently sealed area at said one end and overlapping the removable portion of said liner about its periphery to maintain a tight seal between said outer coaxial electrode and said electrolyte, said thin plastic piece remaining in said cell after said removable portion of said liner has been removed.

No references cited.

ALLEN B. CURTIS, *Primary Examiner.*
WINSTON A. DOUGLAS, *Examiner.*